Jan. 14, 1936.  B. G. CARLSON  2,027,808
ARTIFICIAL HORIZON FOR AIRCRAFT
Filed Nov. 12, 1932
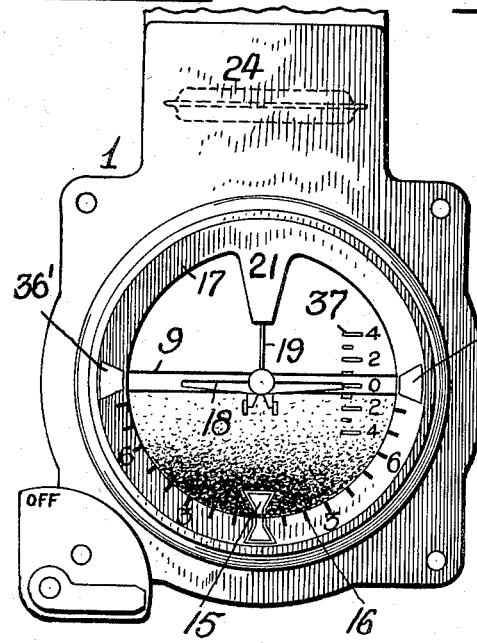
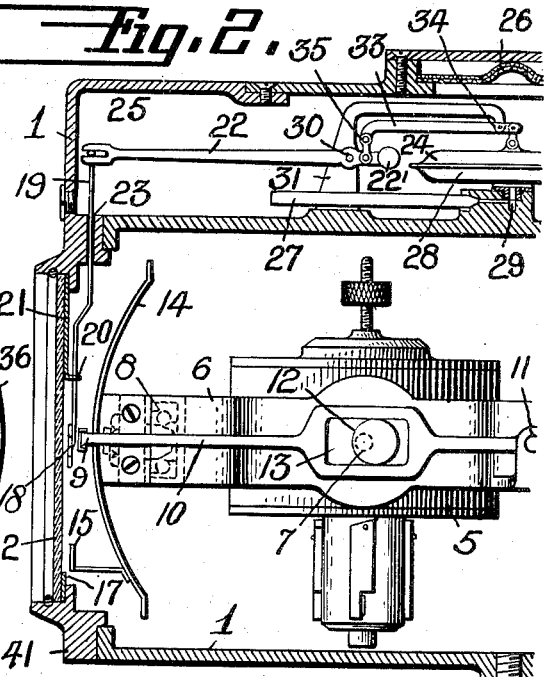
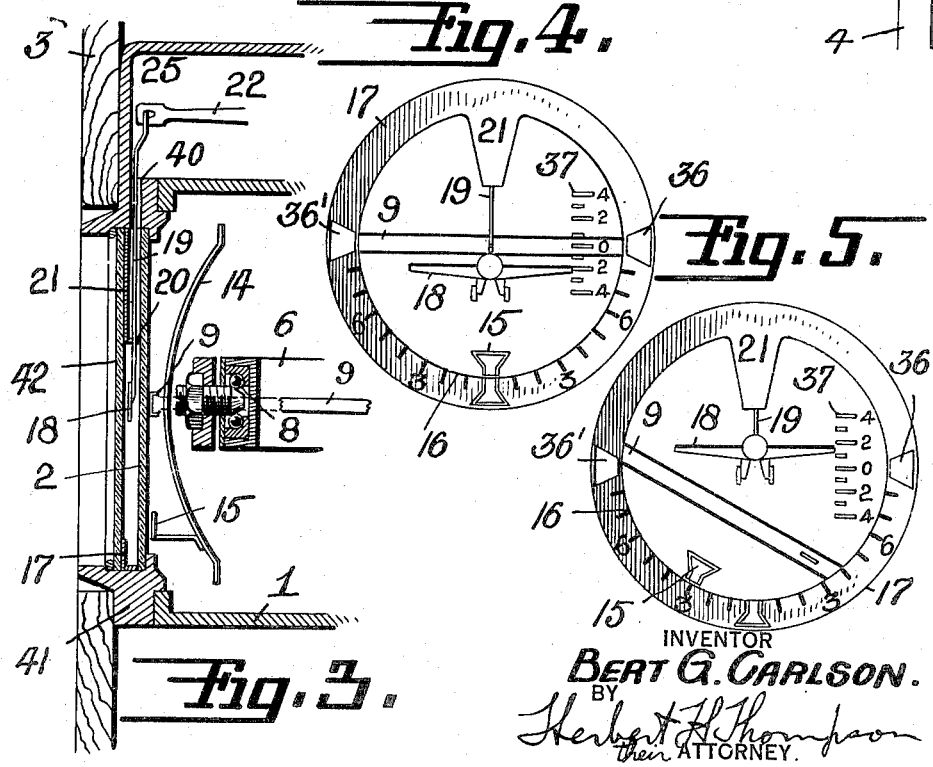
INVENTOR
BERT G. CARLSON.
BY
Herbert H. Thompson
their ATTORNEY.

Patented Jan. 14, 1936

2,027,808

UNITED STATES PATENT OFFICE 2,027,808

ARTIFICIAL HORIZON FOR AIRCRAFT

Bert G. Carlson, Queens Village, N. Y., assignor to Sperry Gyroscope Company, Inc., Brooklyn, N. Y., a corporation of New York Application November 12, 1932, Serial No. 642,361

5 Claims. (Cl. 33—204)

This invention relates to attitude indicators for aircraft. Such instruments are used on the craft for indicating the true horizontal or vertical, are usually actuated by a gyroscope and are preferably so constructed that the movements of the indicator simulate the apparent movements of the real horizon so that the instrument is read naturally and does not have to be interpreted. An example of this type of instrument is shown in the prior application of myself and Leslie F. Carter, Serial No. 639,600, filed October 26, 1932 for Artificial horizons. It has been found, however, that loss and gain of altitude some times occurs in aircraft without affecting the trim of the craft, that is, without actual pitching. Such a phenomenon is usually due to the aircraft striking a rapidly ascending or descending air current or to insufficient air speed. In such case the ordinary artificial horizon gives no indication and, therefore, does not give a true picture of the flying conditions.

According to my invention, I propose to so construct the artificial horizon so that it will also indicate the true conditions under the aforementioned special circumstances so that the artificial horizon may be relied on at all times to show whether the aircraft is flying level, that is, horizontally, and on an even keel. To accomplish this purpose I preferably add no additional indicators on the face of the instrument but provide a means which will indicate to the pilot that the horizon is rising if losing altitude or that the horizon is descending if gaining altitude, even though no actual pitch be present. In other words, the face of the instrument still simulates the apparent movements of the real horizon not only for pitching and rolling but also for descent or ascent without pitching. Preferably also the device differentiates between a real pitch and an apparent pitch due to change of altitude only. Referring to the drawing illustrating several forms of my invention, Fig. 1 is a face view of a horizon constructed in accordance with my invention, Fig. 2 is a vertical section through the casing of the same showing the gyroscope and barometric means in elevation.

Fig. 3 is a similar section through the forward portion of the device showing a modified form of the invention.

Figs. 4 and 5 are face views of the instrument as it appears on the instrument board, showing the positions of the several indicators under different flying conditions.

The instrument is shown as enclosed within a casing 1 having the front end closed by a transparent face 2. The instrument is mounted on the instrument panel 3 as shown in Fig. 3 with only the face thereof visible. The present practice is to continually exhaust the air from the interior of the casing 1 through pipe 4 in order to spin and otherwise actuate the gyroscopic element 5 although it is obvious that the gyroscope may be driven in any suitable manner. Said gyroscope is preferably mounted in a gimbal ring 6 for oscillation about a transverse axis 7, said gimbal in turn being mounted for oscillation about a fore and aft axis 8 within the casing. The movable indicator or horizon bar 9 preferably forms a part of the long lever 10 pivoted on said gimbal ring at 11. Therefore, the horizon bar will be stabilized laterally by the gyroscope and will show banking of the craft. Pitching of the craft also actuates the bar up and down by a cam 12 which may be secured to transverse trunnion 7 of the gyroscope and which engages in an elongated slot 13 in the lever 10 so that as the craft pitches the cam will be rotated with respect to the lever and cause up and down movement of the bar 9, as explained more in detail in the above referred to joint application. Said gimbal ring also carries a mask 14 which conceals the gyroscope and preferably also has painted on or secured thereto an indicator 15 readable upon a scale 16 on the bezel ring 17 to show the angle of bank.

The horizon bar is usually read with reference to an index member 18 which preferably simulates the fuselage or wings of an airplane or some portion thereof. Instead of fixing said indicator to the glass front, however, I prefer to movably mount the same and to actuate it from a barometric means which detects altitude changes. For this purpose I have shown the index 18 as supported from a rod 19 guided in a bearing 20 in the downward extension 21 from the bezel ring 17. Said rod is pivotally supported at its top on a lever 22 and is shown as passing through a stuffing box 23 in the casing 1. It is, of course, necessary that the barometric means be exposed to full atmospheric pressure, that is, that it be placed outside of the casing, from which air is being exhausted. Therefore, I mount the aneroid barometer 24 in a compartment 25 separate from the main casing 1 and exposed to the air through a screened opening 26. The barometer is preferably provided with a small leak connected with capillary tube 27 and leading to one side of the diaphragm 28 through passages 29 so that when the atmospheric pressure is constant the lever 22 remains in its normal position with the indicator 18 at zero. In case of sudden changes of altitude, however, the pressure on the upper side of the diaphragm which is exposed to atmospheric pressure varies more rapidly than the pressure on the lower side, resulting in a movement of the lever and index in one direction or the other depending on whether the pressure is rising or falling. As shown, the lever is pivoted at 30 on a bracket 31 and is connected to the barometer through a link 33 pivoted to said bracket at 34 and connected at opposite ends to the barometer and lever respectively through small link 35. Lever 22 is counterbalanced by mass 22'. The connections are such that the indicator 18 is moved downwardly on descent of the craft and upwardly on ascent. On the other hand, the horizon bar 9 is moved upwardly on downward pitching of the craft and downwardly on upward pitching of the craft. Therefore, as the two indicators are read on each other, the same relative motion takes place for downward pitching and descent and for upward pitching and ascent so that when the bar 9 is above the indicator 18 the aviator knows that he is descending and when it is below the indicator he knows that he is ascending. Also, by reading the bar on the stationary indices 36, 36' or by reading the indicator 18 on the vertical scale 37 on the glass cover, he may easily determine whether the change of altitude is due to pitch or other causes. For instance, if the indicator appears as shown in Fig. 4, the aviator would know that he is descending at a moderately rapid rate without pitching or, in other words, that he was either in a downwardly directed current of air or that he was not maintaining his air speed. On the other hand, under the conditions shown in Fig. 5, the aviator would know that he is pitching upwardly or climbing (and also banking) with resulting increasing altitude.

In Fig. 3 I have shown a modified construction in which the stuffing box 23 for the rod is eliminated so that no frictional load will be placed on the barometer. According to this construction, the rod 19 passes through an aperture 40 of ample clearance which emerges from the forward ring 41 outside of the glass partition 2 so that the rod does not enter the evacuated casing. In order to protect the rod and indicator 18, I provide a second glass cover 42, the indicator 18 lying between said covers.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an artificial horizon for aircraft, a horizon bar, a gyroscopic artificial horizon connected therewith to cause it to simulate the apparent movements of the real horizon on pitching of the craft, a movable reference member therefor, a barometric device, and means connecting said device and member whereby the bar in its apparent movements also simulates the real horizon when the craft is descending or rising without pitch.

2. In an artificial horizon for aircraft, a horizon bar, a gyroscopic artificial horizon connected therewith to cause it to simulate the apparent movements of the real horizon on pitching and rolling of the craft, a vertically movable reference member representing the craft adjacent said bar, a barometric device, means connecting said device for so moving said member whereby the apparent movements of said bar also simulates the real horizon when descending or rising without pitch, and a stationary index adjacent said bar whereby changing altitude without pitch may be distinguished from pitch.

3. In an artificial horizon for aircraft, a pair of indicating members relatively movable up and down, means for maintaining a horizontal reference plane, means connecting said horizontal means and one indicator to cause up and down movement thereof on pitching of the craft simulating the apparent movements of the real horizon, a rate of climb device, and means connecting said device and one indicator to cause apparent up and down movement of said first mentioned indicator on descent and ascent of the craft, also simulating the apparent movements of the real horizon.

4. In an attitude indicator for aircraft, a pair of indicating members relatively movable up and down, a gyroscopic artificial horizon for maintaining a horizontal reference plane, means connecting said horizontal means and an indicator to cause up and down movement thereof on pitching of the craft, a barometric device, means connecting said device and the other indicator to cause up and down movement thereof on change of attitude of the craft, and a third fixed index on which both said other indicators are readable whereby pitch may be distinguished from falling without pitch.

5. In an attitude indicator for aircraft, a pair of indicating members relatively movable up and down, a gyroscopic artificial horizon for maintaining a horizontal reference plane, means connecting said gyroscopic artificial horizon with one of said indicating members to cause up and down movement thereof on pitching of the craft, means responsive to variations in atmospheric pressure, and means connecting said last named means and the other member to cause up and down movement thereof on change of altitude of the craft.

BERT G. CARLSON.